No. 744,584. Patented November 17, 1903.

UNITED STATES PATENT OFFICE.

JACOB MELLINGER, OF BALTIMORE, MARYLAND.

CHEMICAL COMPOUND.

SPECIFICATION forming part of Letters Patent No. 744,584, dated November 17, 1903.

Application filed April 8, 1903. Serial No. 151,675. (No specimens.)

*To all whom it may concern:*

Be it known that I, JACOB MELLINGER, a citizen of the United States, residing at Baltimore, in the State of Maryland, have invented certain new and useful Improvements in Chemical Compounds; and I do hereby declare the following to be a full, clear, and exact description of the invention, such as will enable others skilled in the art to which it appertains to make and use the same.

My invention relates to certain improvements in chemical compounds, more particularly for forming means for binding or effecting the adhesion of certain ingredients or materials to form a homogeneous mass of a character adapted for fuel. Among said materials may be mentioned coal-dust, "turf," slate, lignite, peat, weeds, grass, straw, or like vegetable matter, sawdust, ashes, sand, clay, or earth; also, any kind of fibrous or carbonaceous material or minerals of any kind.

Said compound or composition is produced by dissolving 74.5 of calcined soda in five times that amount of water, combining the solution with fifty-six parts of dry-slaked lime and evaporating the solution thus produced to 1.5 specific gravity. To this mixture is added one hundred and twenty parts of infusorial earth, the whole being amalgamated or fused in a suitable crucible. The ingredients are mixed according to weight. The contents of said crucible when cold are removed, pulverized, and exposed to the action of the air, the same being frequently stirred during that time. The powder thus produced is then washed several times with cold water until the whole is completely dissolved, the same of course being placed in a suitable receptacle for that purpose. This solution is then filtered and evaporated to a specific gravity of 1.25.

This product or composition forms a highly-effective binder, which effects the immediate combining and hardening of coal-dust or any other material which may be used as a body in forming a briquet. The briquet thus formed is dry and can be burned at once in completing the making of the same.

This composition or binder is capable of use not only with coal-dust, but with any kind of fibrous or carbonaceous material, as above noted.

The solution above described possesses an alkaline taste, which when exposed to the action of the air is gradually converted into a gelatinous mass, which finally becomes perfectly hard. This is due to the expulsion of the silicic acid of the compound and the action of the carbonic acid of the air, thus forming a gelatinous mass of hydrated silicic acid. The coal-dust or like material after having been ground finely is mixed with said binder and exposed to a heavy pressure. Said binder is used in a cold state. As soon as the briquet is taken out of the press it can be burned immediately.

It is here noted that my composition is used, as stated, in a cold condition and constitutes a simple and cheap binder, thus differing from all other like binders in that the latter are used in connection with heat for their application—as, for instance, with pitch or other resinous matter—none of which, however, are used in my preparation.

Having thus described my invention, what I claim as new, and desire to secure by Letters Patent, is—

1. The described method for forming a binder for a fuel compound, which consists in dissolving calcined soda and combining therewith dry-slaked lime; evaporating this solution to a certain specific gravity; adding to said mixture infusorial earth, fusing or amalgamating the whole, and, reducing it to a powder; and dissolving and filtering said powder and evaporating the same to a given specific gravity.

2. The described method of producing a binder for a fuel compound, which consists in dissolving 74.5 calcined soda in five times that amount of water, and combining therewith fifty-six parts of dry-slaked lime; evaporating said solution to 1.5 specific gravity; adding to this mixture one hundred and twenty parts of infusorial earth; fusing or amalgamating the whole mass and then pulverizing and dissolving the same, and reducing it to a specific gravity of 1.25; the ingredients being mixed according to weight.

3. A composition of matter consisting of calcined soda, slaked lime, water, and infusorial earth, compounded substantially in the manner herein described.

In testimony whereof I affix my signature in presence of two witnesses.

JACOB MELLINGER.

Witnesses:
CHAS. C. SCHNEPFE,
RAY DICHTER.